United States Patent [19]

Aono

[11] Patent Number: 4,874,231
[45] Date of Patent: Oct. 17, 1989

[54] ZOOM LENS
[75] Inventor: Yasuhiro Aono, Kawasaki, Japan
[73] Assignee: Nikon Corporation, Tokyo, Japan
[21] Appl. No.: 260,717
[22] Filed: Oct. 21, 1988
[30] Foreign Application Priority Data
 Nov. 11, 1987 [JP] Japan .................. 62-284842
[51] Int. Cl.[4] .............................................. G02B 15/14
[52] U.S. Cl. .................................................... 350/427
[58] Field of Search ......................................... 350/427
[56] References Cited
U.S. PATENT DOCUMENTS
 4,135,786 1/1979 Ikemori ............................. 350/427

Primary Examiner—Bruce Y. Arnold
Assistant Examiner—Rebecca D. Gass
Attorney, Agent, or Firm—Shapiro and Shapiro

[57] ABSTRACT

A zoom lens of five-unit construction includes, in succession from the object side, a first lens unit having a positive refractive power and fixed during magnification change, a second lens unit of negative refractive power having the function as a variator effecting magnification change and movable linearly on the optic axis toward the image side during the magnification change from the wide angle end to the telephoto end, a third lens unit and a fourth lens unit having the function as a compensator for correcting the fluctuation of the image surface caused by the magnification change of the second lens unit and keeping the position of the image surface constant and movable on the optic axis with different locuses so as to describe a curve convex toward the object side in conformity with the movement of the second lens unit, a fifth lens unit having the imaging function and fixed with the first lens unit during magnification change, and a stop disposed more adjacent to the image side than the fourth lens unit.

9 Claims, 4 Drawing Sheets

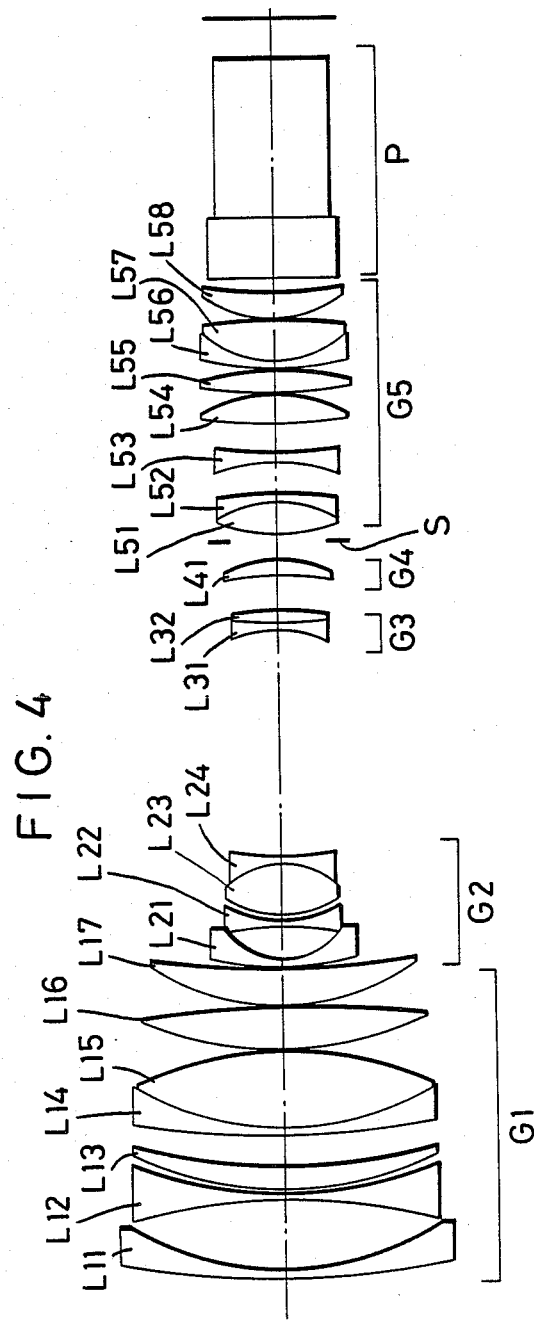

ZOOM LENS

BACKGROUND OF THE INVENTION

1. Field of the Invention

This invention relates to a zoom lens for a television camera, and in particular to a zoom lens for a television camera which is very good in quality of image and is high in precision.

2. Related Background Art

Generally, an image pickup element for a television camera is particularly low in the sensitivity around the screen as compared with a film for a still camera and therefore requires the brightness of F-number 1.2 to 2. Particularly, as a zoom lens for a television camera, a zoom lens is required which maintains such brightness and yet has a large zooming area and has a zoom ratio of five to twenty times.

Numerous zoom lens types have heretofore been proposed, and a zoom lens of the type basically of the positive-negative-negative-positive four-unit construction has a merit that a relatively high magnification and a great aperture can be achieved. A lens system of this type is of four-unit construction in which a first lens unit is endowed with the focusing function, a second lens unit is endowed with the function of a variator for effecting magnification change, a third lens unit is endowed with the function of a compensator for correcting the fluctuation of the image surface caused by magnification change and keeping it constant and a fourth lens unit is endowed with the imaging function. A system is adopted in which when zooming is to be effected from the wide angle end to the telephoto end, the second lens unit is moved linearly toward the image side and the third lens unit is moved toward the object side so as to describe a convex curve.

Recently, the advance of the electronic image art is remarkable and television of high precision which is markedly better in quality of image than the conventional television images is being developed. As a lens for such a television camera of high precision, a lens of high performance having little residual aberrations is required. However, the conventional zoom lenses have great residual aberrations and also suffer from a great aberration fluctuation by zooming and therefore have been insufficient for use as lenses for television cameras of high precision.

In the conventional zoom lenses, particularly with zooming, the fluctuation of the curvature of image field from the intermediate position to the telephoto end (the telephoto position) has been very great and negative curvature of image field has been ready to occur at the telephoto end. If this aberration is corrected at the wide angle end and the telephoto end, positive curvature of image field occurs excessively at a position slightly toward the wide angle side from the telephoto end, and this is not preferable. Therefore, even if the power arrangement of each lens unit is loosened or the number of lenses is increased to improve the degree of freedom of aberration correction, it has been very difficult to correct the fluctuation of this curvature of image field. Therefore, in the conventional zoom lenses, it has not been possible to extract a satisfactory performance as a lens for high precision.

SUMMARY OF THE INVENTION

Accordingly, it is an object of the present invention to solve the above-noted problems and to provide a zoom lens of high performance which has a great aperture and is compact and in which good aberration correction is done.

The present invention is a zoom lens basically comprising, in succession from the object side, five lens units, i.e., a first lens unit G1 having a positive refractive power, a second lens unit G2 of negative refractive power having the function of a variator for effecting magnification change, a third lens unit G3 and a fourth lens unit G4 having the function of a compensator for correcting the fluctuation of the image surface caused by the magnification change of said variator and keeping the position of the image surface constant, and a fifth lens unit G5 of positive refractive power having the imaging function, and intends to solve the above-noted problems by fixing said first lens unit G1 and said fifth lens unit G5, moving said second lens unit G2 linearly toward the image side and moving said third lens unit G3 and said fourth lens unit G4 with different focuses so as to describe a curve convex toward the object side when magnification change is effected from the wide angle end to the telephoto end.

Further, in the zoom lens of the basic construction of the present invention as described above, it is desirable to satisfy the following conditions:

$$2.5 < |f_3/f_2| < 4.0 \tag{1}$$

$$3.5 < |f_4/f_2| < 6.5 \tag{2}$$

where $f_2$ is the focal length of the second lens unit G2, $f_3$ is the focal length of the third lens unit G3 and $f_4$ is the focal length of the fourth lens unit G4.

The present invention intends to accomplish good aberration correction by making a five-unit construction with two compensators disposed in a zoom lens of four-unit construction. In a zoom lens basically of the type which is a positive-negative-negative-positive four-unit construction and wherein a stop S is disposed in the last fourth lens unit, the principle of the present invention will hereinafter be specifically described with reference to FIG. 1 of the accompanying drawings.

In the conventional zoom lens of this type, zooming has been accomplished by fixing the first lens unit and the fourth lens unit comprising a front unit and a rear unit, moving the second lens unit toward the image side to effect magnification change and moving the third lens unit which is a compensator toward the object side so as to describe a convex curve when zooming is effected from the wide angle and W to the telephoto end T as indicated by dotted line C.

So, in the present invention, the fourth lens unit of the conventional zoom lens of four-unit construction is divided into a front unit and a rear unit, and the front unit is defined as the fourth lens unit G4 and the rear unit is defined as the fifth lens unit, and the fourth lens unit G4 (the front unit of the fourth lens unit in the conventional zoom lens of four-unit construction) comprising at least one lens which is a part of the conventional fourth lens unit and is more adjacent to the object side than the stop S and having a positive refractive power is moved so as to describe a curve convex toward the object side as indicated by solid line B during zooming to thereby endow this lens unit with the function as a second compensator. Therefore, these two compensators (the third lens unit G3 and the fourth lens unit G4) can be endowed with both of the function of correcting the fluctuation of the image surface caused by magnification change and keeping it constant and the function of suppressing residual aberrations and the fluctuation of the aberrations. Accordingly, by adopting such system in which the two compensators G3 and G4 are moved in the same direction, there can be provided a basic construction capable of extracting a high performance.

That is, if design is made such that in the intermediate position, the third lens unit G3 having a negative refractive power and the fourth lens unit G4 having a positive refractive power are both moved greatly toward the object side as indicated by solid lines A and B so that particularly the spacing between the third lens unit G3 and the stop S is great, the principal light ray passing through the third lens unit G3 goes away from the optic axis and negative curvature of image field occurs. Accordingly, positive curvature of image field occurring excessively greatly in the intermediate position M can be offset by said negative curvature of image field and therefore, the fluctuation of curvature of image field can be suppressed over the full zoom range.

The position of the stop S is not limited to the position between the fourth lens unit G4 moved for the correction of the image surface and the fixed fifth lens G5, but the stop S may also be provided in the fifth lens unit G5.

Also, to achieve sufficient aberration correction and compactness, it is desirable to construct the zoom lens so as to satisfy the aforementioned conditions (1) and (2). The conditions (1) and (2) will hereinafter be described in detail.

The condition (1) shows the appropriate ratio of the refractive powers of the second lens unit G2 which is a variator and the third lens unit G3 which is a compensator. If the upper limit of the condition (1) is exceeded, movement of the third lens unit G3 will become great and therefore, if the fourth lens unit G4 is moved in the intermediate position M, the third lens unit G3 will be further moved toward the object side and will cause mechanical interference with the second lens unit G2, and this is not preferable. To avoid this and secure the movement space by zooming, the distance between the second lens unit G2 and the third lens unit G3 must be secured sufficiently but this would result in an increased diameter of the front lens of the first lens unit G1. Accordingly, after all, this would result in the bulkiness of the lens system which is not preferable.

On the other hand, if the lower limit of the condition (1) is exceeded, the amount of movement of the third lens unit G3 can be made small and it will become possible to achieve compactness, but the fluctuations of spherical aberration and coma by zooming will become great, and this is not preferable. If an attempt is therefore made to correct the spherical aberration occurring in the third lens unit G3, the burden of the fifth lens unit G5 having the imaging function will become great and high-order spherical aberration will become ready to occur, and this is inconvenient.

The condition (2) is a condition for effectively decreasing the difference between the curvatures of image field at the intermediate position M and the telephoto end T. If the upper limit of the condition (2) is exceeded, the refractive power of the fourth lens unit G4 will become too small and therefore, even if in the intermediate position M, the fourth lens unit G4 is moved toward the object side during zooming, the third lens unit G3 cannot be further moved toward the object side. Therefore, a sufficient spacing cannot be secured between the third lens unit G3 and the stop S and thus, the position of the principal light ray passing through the third lens unit G3 changes little. Accordingly, negative curvature of image field does not occur and the fluctuation of curvature of image field becomes great from the intermediate position M to the telephoto end T, and this is unsuitable.

On the other hand, if the lower limit of the condition (2) is exceeded, the refractive power of the fourth lens unit G4 will become too great and the converging action by the fourth lens unit G4 will become great. Accordingly, the angle, i.e., the angle of inclination, formed by the principal light ray passed through the third lens unit G3 with respect to the optic axis will become small and therefore, if the third lens unit G3 is moved more toward the object side to secure a sufficient spacing between the third lens unit and the stop S, the position of the principal light ray passing through the third lens unit G3 will change little. Therefore, the fluctuations of the curvature of image field at the intermediate position M and the telephoto end T will become very great, and this is not preferable.

Further, to well correct the fluctuations of spherical aberration and coma caused by zooming, it is desirable that the third lens unit G3 and the fourth lens unit G4 be constructed in a meniscus shape having its convex surface facing the image side which satisfies the following conditions:

$$-4.0 < \frac{R_{30} + R_{3i}}{R_{30} - R_{3i}} < -1.4 \quad (3)$$

$$2.8 < \frac{R_{40} + R_{4i}}{R_{40} - R_{4i}} < 9.5 \quad (4)$$

where $R_{30}$ and $R_{40}$ are the radii of curvature of the surfaces of the third lens unit G3 and the fourth lens unit G4 which are most adjacent to the object side, and $R_{3i}$ and $R_{4i}$ are the radii of curvature of the surfaces of the third lens unit G3 and the fourth lens unit G4 which are most adjacent to the image side. Particularly, by constructing the third lens unit G3 of a meniscus-shaped lens, an effect is obtained in the correction of spherical aberration and the center thickness of the third lens unit G3 can be made small and therefore, a light weight can be achieved and yet a movable space by zooming can be secured.

Also, to suppress the fluctuation of on-axis chromatic aberration caused by zooming, it is desirable that the third lens unit G3 and the fourth lens unit G4 be constructed so as to satisfy the following conditions:

$$\nu_{G3} > 45 \quad (5)$$

$$\nu_{G4} > 33 \quad (6)$$

where $\nu_{G3}$ and $\nu_{G4}$ are the Abbe numbers of the third lens unit G3 and the fourth lens unit G4, respectively. However, where one of the third lens unit G3 and the fourth lens unit G4 each having the function of a compensator is comprised of a cemented lens, when the composite focal length of the cemented lens is $f_c$ and the focal length and the Abbe number of the lens which is adjacent to the object side are $f_a$ and $\nu_a$, respectively, and the focal length and the Abbe number of the lens which is adjacent to the image side are $f_b$ and $\nu_b$, respectively, it is to be understood that the Abbe number $\nu_c$ of the third lens unit $G_3$ and the fourth lens unit $G_4$ one of which is a cemented lens is defined by $$\frac{1}{v_c f_c} = \frac{1}{v_a f_a} + \frac{1}{v_b f_b} \qquad (7)$$

Here, to accomplish the correction of chromatic aberration sufficiently, it is desirable that the lenses constituting the third lens unit $G_3$ and the fourth lens unit $G_4$ be constructed of a cemented lens consisting of a negative lens and a positive lens, but if said lenses are not constructed so that the aforementioned conditions (5) and (6) are satisfied, negative chromatic aberration at the intermediate position M will occur very greatly, and this is not preferable.

In order to correct spherical aberration and coma, a construction may be adopted in which there is provided an aspherical lens in which the lens surface adjacent to the stop is an aspherical surface. However, as regards the aspherical shape of this aspherical lens, when with the vertex of the lens as the origin, the optic axis is the x-axis and the axis perpendicular to the optic axis and passing through the vertex of the lens surface is the y-axis, the value of the x coordinates for the y coordinates h is expressed as the following equation (8):

$$x = \frac{h^2 C_o}{1 + \sqrt{1 - kh^2 C_o^2}} + A_1 h^2 + A_2 h^4 + A_3 h^6 + A_4 h^8 + A_5 h^{10} \qquad (8)$$

where $C_o$ is the curvature of the standard spherical surface, k is the cone constant, and A is the aspherical surface coefficient.

As described above, according to the present invention, there can be realized a compact zoom lens of great aperture in which the residual aberrations and the fluctuations of aberrations which have heretofore deteriorated the optical performance are suppressed very well in the full zoom range and particularly curvature of image field is corrected well.

Other objects, features and effects of the present invention will become fully apparent from the following detailed description of the invention taken in conjunction with the accompanying drawings.

BRIEF DESCRIPTION OF THE DRAWINGS

FIGS. 2, 3 and 4 show the constructions of lenses in Embodiments 1 to 3 of the present invention.

DESCRIPTION OF THE PREFERRED EMBODIMENTS

Figure 1:
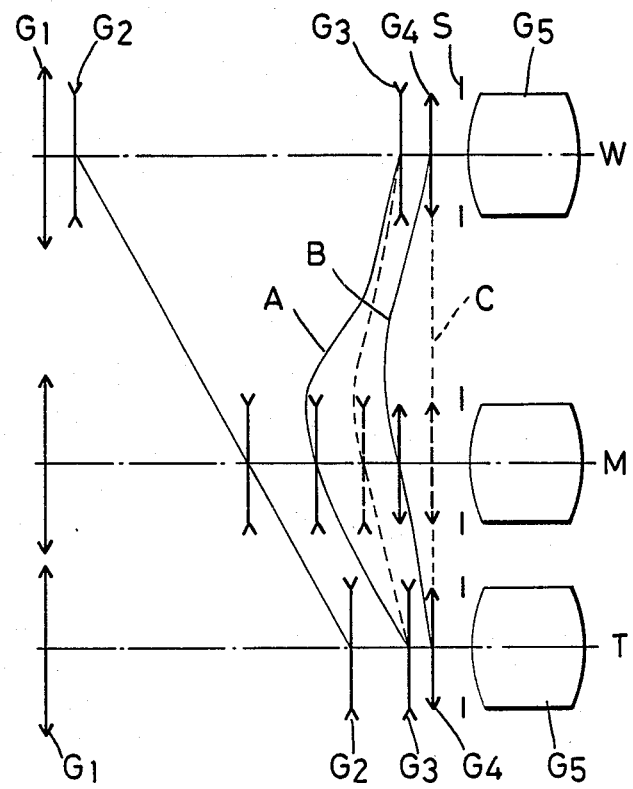
FIG. 1 illustrates the principle of the present invention.
Figure 2:
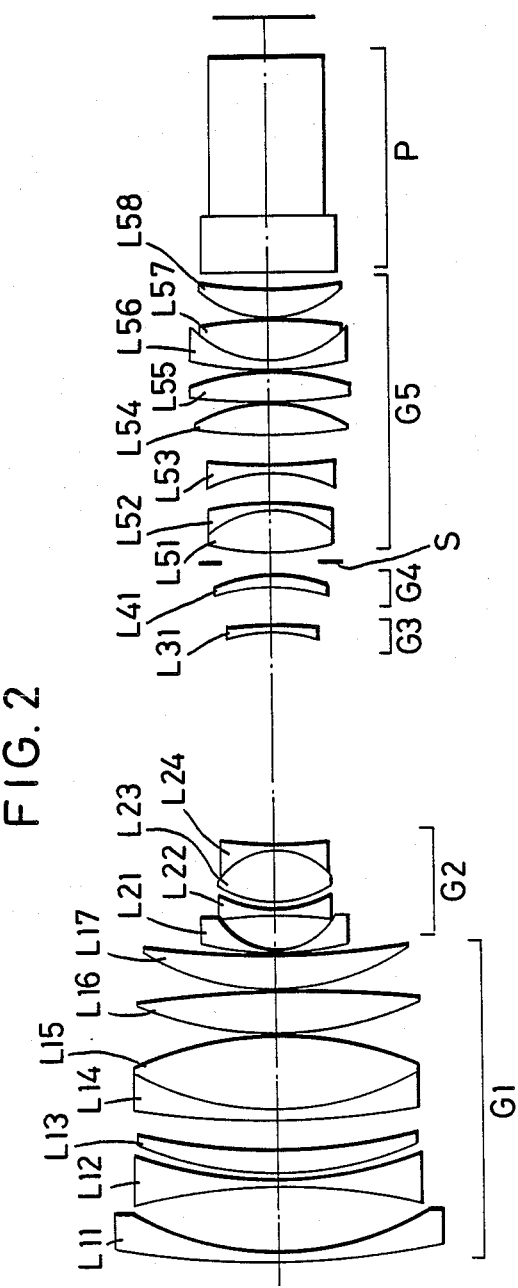

With reference to FIG. 2 which shows the lens construction in Embodiment 1 of the present invention, description will hereinafter be made of the specific construction of each lens unit in this Embodiment 1. A first lens unit $G_1$ comprises a negative meniscus lens L11 having its convex surface facing the object side, a biconcave negative lens L12 a positive meniscus lens L13 having its convex surface facing the object side, a negative meniscus lens L14 having its convex surface facing the object side, a biconvex positive lens L15 joined thereto, a biconvex positive lens L16 having its surface of sharper curvature facing the object side, and a positive meniscus lens L17 having its convex surface facing the object side, and has a positive refractive power as a whole.

A second lens unit G2 having the function of a variator comprises a negative meniscus lens L21 having its convex surface facing the object side, a biconcave negative lens L22, a biconvex positive lens L23 and a negative lens L24 joined thereto and having its surface of sharper curvature facing the object side, and has a negative refractive power as a whole.

Further, a third lens unit G3 having a negative refractive power and a fourth lens unit G4 having a positive refractive power both comprises a lens and yet has the function of a compensator. The third lens unit G3 comprises a negative meniscus lens L31 having its surface of sharper curvature facing the object side, and is particularly effective for the correction of spherical aberration by its shape. On the other hand, the fourth lens unit G4 comprises a positive meniscus lens L41 having its convex surface facing the image side. Each compensator L31, L41 is constructed into a meniscus shape and is of an advantageous construction for suppressing the fluctuations of spherical aberration and coma.

Finally, a fifth lens unit having the imaging function comprises a biconvex positive lens L51, a negative meniscus lens L52 joined thereto and having its convex surface facing the image side, a biconcave negative lens L53, a biconvex positive lens L54 having its surface of sharper curvature facing the image side a biconvex positive lens L55, a negative meniscus lens L56 having its convex surface facing the object side, a biconvex positive lens L57 joined thereto and having its surface of sharper curvature facing the object side, and a positive meniscus lens L58 having its convex surface facing the object side, and has a positive refractive power as a whole.

A stop S is disposed between the fourth lens unit G4 and the fifth lens unit G5, and a prism P such as a three-color resolving prism is disposed between the fifth lens unit G5 and the image surface. Also, by axially moving the three lenses L11–L13 in the first lens unit G1 in succession from the object side toward the object side as a unit, it is possible to accomplish focusing to a short distance object.

The numerical data of Embodiment 1 of the present invention will be shown in Table 1 below, and the variable spacings between the units at various positions will be shown in Table 2 below. In Table 1, r represents the radius of curvature, d represents the inter-surface spacing, n represents the refractive index with e-line (546.1 nm) as the reference wavelength, ν represents the Abbe number with d-line (587.6 nm) as the reference, 2ω represents the angle of view, and FNO represents the F-number.

TABLE 1

| (Embodiment 1) | | | | |
|---|---|---|---|---|
| Focal length: 12.8–67.5 | | Zoom ratio: 5.27 | | |
| Angle of view 2ω = 66.1–13.4 | | FNO: 1.5 | | |
| No. | Radius of curvature r | Center-thickness and spacing d | Refractive index n | Abbe number ν |
| 1 | 339.738 | 3.400 | 1.62287 | 60.14 | $G_1$ |
| 2 | 108.122 | 20.000 | | |
| 3 | −249.753 | 2.500 | 1.62287 | 60.14 |
| 4 | 141.674 | 1.000 | | |
| 5 | 122.834 | 8.000 | 1.86954 | 23.01 |
| 6 | 213.054 | 9.351 | | |
| 7 | 317.399 | 3.300 | 1.86954 | 23.01 |
| 8 | 109.776 | 23.500 | 1.49926 | 82.52 |

TABLE 1-continued (Embodiment 1)

Focal length: 12.8-67.5  Zoom ratio: 5.27
Angle of view 2ω = 66.1-13.4  FNO: 1.5

| No. | Radius of curvature r | Center-thickness and spacing d | Refractive index n | Abbe number ν | |
|---|---|---|---|---|---|
| 9 | −133.088 | 0.200 | | | |
| 10 | 125.476 | 13.700 | 1.59527 | 67.87 | |
| 11 | −472.357 | 0.200 | | | |
| 12 | 77.994 | 11.800 | 1.49926 | 82.52 | |
| 13 | 324.018 | $d_{13}$ = variable | | | |
| 14 | 107.528 | 1.200 | 1.61992 | 54.01 | $G_2$ |
| 15 | 22.959 | 11.200 | | | |
| 16 | −106.622 | 1.200 | 1.62540 | 57.03 | |
| 17 | 51.368 | 1.600 | | | |
| 18 | 35.182 | 16.700 | 1.65530 | 38.18 | |
| 19 | −25.804 | 1.200 | 1.74800 | 49.52 | |
| 20 | 182.729 | $d_{20}$ = variable | | | |
| 21 | −43.137 | 1.500 | 1.72342 | 50.19 | $G_3$ |
| 22 | −120.634 | $d_{22}$ = variable | | | |
| 23 | −65.472 | 4.000 | 1.86954 | 23.01 | $G_4$ |
| 24 | −47.715 | $d_{24}$ = variable | | | |
| 25 | 63.154 | 12.500 | 1.60718 | 38.03 | $G_5$ |
| 26 | −39.449 | 2.000 | 1.80824 | 46.54 | |
| 27 | −143.650 | 10.000 | | | |
| 28 | −52.490 | 2.000 | 1.69978 | 55.60 | |
| 29 | 142.269 | 11.000 | | | |
| 30 | 215.187 | 10.000 | 1.51872 | 64.10 | |
| 31 | −51.841 | 0.200 | | | |
| 32 | 236.399 | 10.000 | 1.52037 | 69.98 | |
| 33 | −112.413 | 0.200 | | | |
| 34 | 142.608 | 2.500 | 1.81267 | 25.35 | |
| 35 | 38.435 | 13.500 | 1.49926 | 82.52 | |
| 36 | −285.137 | 0.200 | | | |
| 37 | 42.377 | 8.500 | 1.52037 | 69.98 | |
| 38 | 135.289 | 5.000 | | | |
| 39 | ∞ | 18.500 | 1.51872 | 64.10 | P |
| 40 | ∞ | 50.500 | 1.69978 | 55.60 | |
| 41 | ∞ | 11.890 | | | |

TABLE 2

(variable spacings between units in Embodiment 1)

| f | 12.8 | 40.0 | 67.5 |
|---|---|---|---|
| $d_{13}$ | 0.629 | 48.012 | 61.783 |
| $d_{20}$ | 66.296 | 5.582 | 5.812 |
| $d_{22}$ | 12.426 | 17.256 | 13.255 |
| $d_{24}$ | 6.598 | 15.098 | 5.098 |

Figure 3:
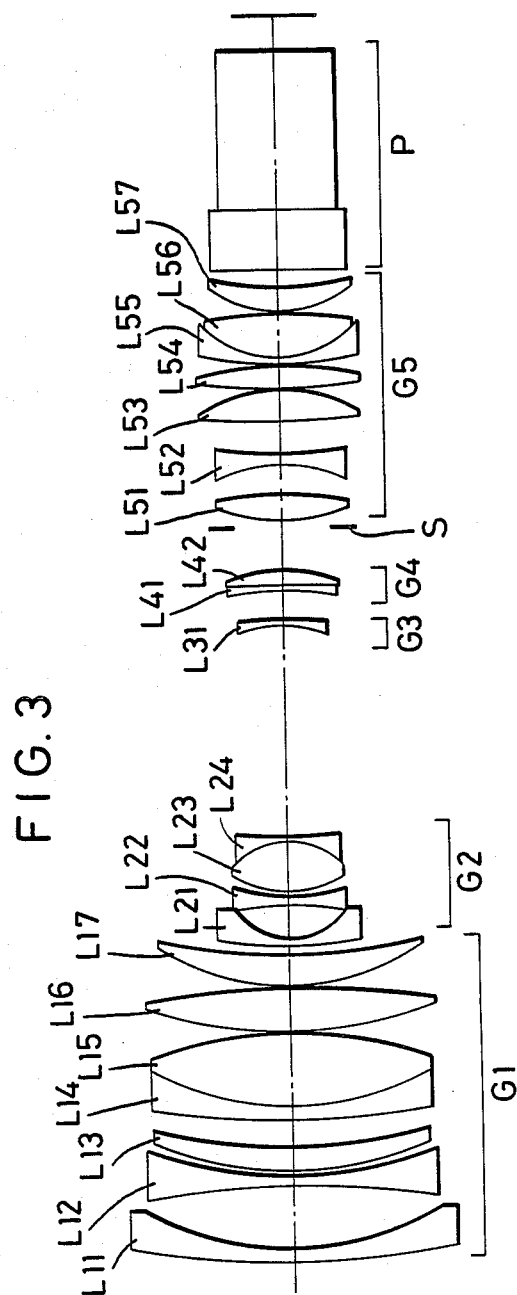

Embodiment 2 differs from Embodiment 1 chiefly in only parts of the fourth lens unit G4 and the fifth lens unit G5. The differences will hereinafter be described with reference to FIG. 3 which shows the construction of Embodiment 2.

A third lens unit G3 having the function of a first compensator comprises a single lens, i.e., a negative meniscus lens L31 having its surface of sharper curvature facing the object side, and is of an advantageous shape particularly for the correction of spherical aberration. On the other hand, a fourth lens unit having the function of a second compensator comprises two lenses, i.e., a negative lens L41 having its surface of sharper curvature facing the object side, and a positive lens L42 joined thereto and having its surface of sharper curvature facing the object side, and is generally of a positive meniscus shape and of a construction which corrects chromatic aberration well.

Moreover, the shapes of these two compensators are a meniscus shape having its convex surface facing the image side and therefore, this is an effective construction for the correction of coma and spherical aberration.

As regards a fifth lens unit G5, the lens component of this unit which is most adjacent to the object side is comprised of a cemented lens consisting of a positive lens L51 and a negative lens L57 cemented together in Embodiment 1, but in the second embodiment, the correction of chromatic aberration corresponding thereto is accomplished by a fourth lens unit G4 and therefore, the lens component of the fourth lens unit G4 which is most adjacent to the object side is comprised only of a positive single lens L51.

The image side surface of the lens L51 of the fifth lens unit G5 which is most adjacent to the object side (in Table 3 below, the 27th surface) is comprised of an aspherical lens in which the cone constant k=1 and the aspherical coefficients are $A_2 = 1.69060 \times 10^{-7}$, $A_3 = -2.33580 \times 10^{-10}$ and $A_4 = 1.74950 \times 10^{-13}$, in order to better the correction of spherical aberration and coma. In Table 3, the reference radius of curvature is shown in the 27th surface.

Focusing of the second embodiment is accomplished by axially moving the three lenses L11–L13 in the first lens unit G1 in succession from the object side toward the object side.

The numerical data in Embodiment 2 will be shown in Table 3 below, and the variable spacings between the units will be shown in Table 4 below.

TABLE 3

(Embodiment 2)

Focal length: 12.8-67.4  Zoom ratio: 5.27
Angle of view 2ω = 66.1-13.4  FNO: 1.5

| No. | Radius of curvature r | Center-thickness and spacing d | Refractive index n | Abbe number ν | |
|---|---|---|---|---|---|
| 1 | 339.738 | 3.400 | 1.62287 | 60.14 | $G_1$ |
| 2 | 108.122 | 20.000 | | | |
| 3 | −249.753 | 2.500 | 1.62287 | 60.14 | |
| 4 | 141.674 | 1.000 | | | |
| 5 | 122.834 | 8.000 | 1.86954 | 23.01 | |
| 6 | 213.054 | 8.782 | | | |
| 7 | 318.127 | 3.300 | 1.86954 | 23.01 | |
| 8 | 101.285 | 23.500 | 1.49926 | 82.52 | |
| 9 | −151.087 | 0.200 | | | |
| 10 | 128.047 | 14.500 | 1.62287 | 60.14 | |
| 11 | −289.393 | 0.200 | | | |
| 12 | 76.961 | 11.000 | 1.49926 | 82.52 | |
| 13 | 249.760 | $d_{13}$ = variable | | | |
| 14 | 107.528 | 1.200 | 1.61992 | 54.01 | $G_2$ |
| 15 | 22.959 | 11.200 | | | |
| 16 | −115.190 | 1.200 | 1.65426 | 58.50 | |
| 17 | 49.661 | 1.600 | | | |
| 18 | 35.540 | 16.700 | 1.65530 | 38.18 | |
| 19 | −28.116 | 1.200 | 1.77651 | 49.45 | |
| 20 | 309.744 | $d_{20}$ = variable | | | |
| 21 | −43.137 | 1.500 | 1.77651 | 49.45 | $G_3$ |
| 22 | −107.766 | $d_{22}$ = variable | | | |
| 23 | −71.854 | 2.000 | 1.80086 | 45.37 | $G_4$ |
| 24 | −320.000 | 4.500 | 1.81267 | 25.35 | |
| 25 | −50.789 | $d_{25}$ = variable | | | |
| 26 | 58.324 | 8.000 | 1.55098 | 45.87 | $G_5$ |
| 27 | −153.033 | 10.000 | | | |
| 28 | −45.245 | 2.000 | 1.72342 | 50.19 | |
| 29 | 146.257 | 11.000 | | | |
| 30 | 217.601 | 10.500 | 1.52040 | 60.23 | |
| 31 | −53.615 | 0.200 | | | |
| 32 | 232.170 | 7.000 | 1.52037 | 69.98 | |
| 33 | −111.303 | 0.200 | | | |
| 34 | 137.366 | 2.500 | 1.81267 | 25.35 | |
| 35 | 38.126 | 13.500 | 1.48914 | 70.41 | |
| 36 | −193.091 | 0.200 | | | |
| 37 | 42.377 | 8.500 | 1.52037 | 69.98 | |
| 38 | 99.668 | 5.000 | | | |
| 39 | ∞ | 18.500 | 1.51872 | 64.10 | P |
| 40 | ∞ | 50.500 | 1.69978 | 55.60 | |
| 41 | ∞ | 11.974 | | | |

TABLE 4

(variable spacings between units in Embodiment 2)

| f | 12.8 | 40.0 | 67.4 |
|---|---|---|---|
| $d_{13}$ | 1.783 | 49.089 | 62.937 |
| $d_{20}$ | 65.888 | 3.547 | 5.404 |
| $d_{22}$ | 8.988 | 13.522 | 9.817 |
| $d_{25}$ | 15.894 | 26.394 | 14.394 |

Embodiment 3 differs from Embodiment 1 only in the construction of a third lens unit. The difference will hereinafter be described with reference to FIG. 4 which shows the construction of Embodiment 3.

A third lens unit G3 having the function of a first compensator and having a negative refractive power comprises two lenses, i.e., a negative lens L31 having its surface of sharper curvature facing the object side, and a biconvex positive lens L32 joined thereto, and is of advantageous construction for the correction of chromatic aberration, and as a whole, it is of a negative meniscus shape having its surface of sharper curvature facing the object side, and is of an advantageous shape for the correction of spherical aberration.

Focusing of the third embodiment is accomplished by axially moving the three lenses L11-L13 of the first lens unit in succession from the objective side toward the object side.

The numerical data in Embodiment 3 will be shown in Table 5 below, and the variable spacings between the units will be shown in Table 6 below.

TABLE 5

(Embodiment 3)

Focal length: 12.7-70.0  Zoom ratio: 5.51
Angle of view $2\omega = 66.3$-13.4  FNO = 1.5

| No. | Radius of curvature r | Center-thickness and spacing d | Refractive index n | Abbe number $\nu$ | |
|---|---|---|---|---|---|
| 1 | 352.819 | 3.400 | 1.62287 | 60.14 | $G_1$ |
| 2 | 112.285 | 20.000 | | | |
| 3 | −259.369 | 2.500 | 1.62287 | 60.14 | |
| 4 | 147.129 | 1.000 | | | |
| 5 | 127.563 | 8.000 | 1.86954 | 23.01 | |
| 6 | 221.257 | 9.351 | | | |
| 7 | 342.701 | 3.300 | 1.86954 | 23.01 | |
| 8 | 110.315 | 23.500 | 1.49926 | 82.52 | |
| 9 | −141.122 | 0.200 | | | |
| 10 | 125.876 | 13.700 | 1.60548 | 60.64 | |
| 11 | −406.401 | 0.200 | | | |
| 12 | 78.871 | 11.800 | 1.49926 | 82.52 | |
| 13 | 268.252 | $d_{13}$ = variable | | | |
| 14 | 108.635 | 1.200 | 1.61992 | 54.01 | $G_2$ |
| 15 | 23.195 | 11.200 | | | |
| 16 | −137.323 | 1.200 | 1.62540 | 57.03 | |
| 17 | 43.672 | 1.600 | | | |
| 18 | 33.753 | 16.700 | 1.65530 | 38.18 | |
| 19 | −26.661 | 1.200 | 1.74800 | 49.52 | |
| 20 | 179.896 | $d_{20}$ = variable | | | |
| 21 | −44.766 | 1.500 | 1.72342 | 50.19 | $G_3$ |
| 22 | 250.000 | 3.400 | 1.81267 | 25.35 | |
| 23 | −149.383 | $d_{23}$ = variable | | | $G_4$ |
| 24 | −93.667 | 4.000 | 1.76258 | 31.62 | |
| 25 | −50.815 | $d_{25}$ = variable | | | |
| 26 | 64.773 | 10.000 | 1.55098 | 45.87 | $G_5$ |
| 27 | −40.425 | 2.000 | 1.80824 | 46.54 | |
| 28 | −147.189 | 10.000 | | | |
| 29 | −56.000 | 2.000 | 1.67303 | 57.53 | |
| 30 | 145.269 | 11.000 | | | |
| 31 | 211.361 | 9.000 | 1.51872 | 64.10 | |
| 32 | −53.380 | 0.200 | | | |
| 33 | 173.525 | 7.000 | 1.56606 | 60.69 | |
| 34 | −122.090 | 0.200 | | | |
| 35 | 155.690 | 2.500 | 1.79181 | 26.05 | |
| 36 | 38.224 | 13.000 | 1.49926 | 82.52 | |
| 37 | −562.364 | 0.200 | | | |

TABLE 5-continued (Embodiment 3)

Focal length: 12.7-70.0  Zoom ratio: 5.51
Angle of view $2\omega = 66.3$-13.4  FNO = 1.5

| No. | Radius of curvature r | Center-thickness and spacing d | Refractive index n | Abbe number $\nu$ | |
|---|---|---|---|---|---|
| 38 | 45.431 | 7.500 | 1.51872 | 64.10 | |
| 39 | 143.237 | 5.000 | | | |
| 40 | ∞ | 18.500 | 1.51872 | 64.10 | |
| 41 | ∞ | 50.500 | 1.69978 | 55.60 | P |
| 42 | ∞ | 12.040 | | | |

TABLE 6

(variable spacings between units in Embodiment 3)

| f | 12.7 | 40.0 | 70.0 |
|---|---|---|---|
| $d_{13}$ | 0.588 | 49.862 | 65.024 |
| $d_{20}$ | 71.666 | 8.299 | 6.185 |
| $d_{23}$ | 11.846 | 19.439 | 12.891 |
| $d_{25}$ | 9.302 | 15.802 | 9.302 |

In the foregoing, there have been shown embodiments in which the fourth lens unit in the zoom lens of the conventional four-unit construction type comprising positive, negative, negative and positive lenses is divided into two and a part thereof is endowed with the function of a compensator, but a system in which the compensator of the third lens unit is divided into two which are moved relative to each along the optic axis may also be adopted to suppress the residual aberrations and the fluctuations of the aberrations, and the present invention can also be adapted for the positive-negative-positive-positive type four-unit zoom lens. Further, of course, the present invention can also be adapted for zoom lenses of other types.

Further, in each embodiment, focusing is accomplished by axially moving a part of the first lens unit G1, but it is also possible to accomplish focusing by axially moving the entire lens unit G1, and it is also possible to accomplish focusing by rear focus.

What is claimed is:

1. A zoom lens of five-unit construction including, in succession from the object side: a first lens unit having a positive refractive power and which is fixed during magnification change; a second lens unit of negative refractive power having the function as a variator effecting magnification change and which is movable linearly on the optic axis toward the image side during the magnification change from the wide angle end to the telephoto end; a third lens unit and a fourth lens unit, having the function as a compensator for correcting the fluctuation of the image surface caused by the magnification change of said second lens unit and for keeping the position of said image surface constant, movable on the optic axis with different locuses so as to describe a curve convex toward the object side in conformity with said movement of said second lens unit; a fifth lens unit having an imaging function and fixed with said first lens unit during magnification change; and a stop disposed more adjacent to the image side than said fourth lens unit.

2. A zoom lens according to claim 1, constructed so as to satisfy the following conditions:

$$2.5 < |f_3/f_2| < 4.0 \qquad (1)$$

$$3.5 < |f_4/f_2| < 6.5 \qquad (2)$$

where $f_2$ is the focal length of said second lens unit, $f_3$ is the focal length of said third lens unit, and $f_4$ is the focal length of said fourth lens unit.

3. A zoom lens according to claim 1, wherein said third lens unit and said fourth lens unit are each constructed in a meniscus shape having its convex surface facing the image side so as to satisfy the following conditions:

$$-4.0 < \frac{R_{30} + R_{3i}}{R_{30} - R_{3i}} < -1.4 \quad (3)$$

$$2.8 < \frac{R_{40} + R_{4i}}{R_{40} - R_{4i}} < 9.5 \quad (4)$$

where $R_{30}$ is the radius of curvature of the surface of said third lens unit which is most adjacent to the object side, $R_{3i}$ is the radius of curvature of the surface of said third lens unit which is most adjacent to the image side, $R_{40}$ is the radius of curvature of the surface of said fourth lens unit which is most adjacent to the object side, and $R_{4i}$ is the radius of curvature of the surface of said fourth lens unit which is most adjacent to the image side.

4. A zoom lens according to claim 1, wherein said third lens unit is comprised of a negative meniscus single lens having its convex surface facing the image side, said fourth lens unit is comprised of a positive meniscus single lens having its convex surface facing the image side, and said negative meniscus single lens and said positive meniscus single lens satisfy the conditions that $\nu_{63} > 45$ and $\nu_{64} > 33$, where $\nu_{63}$ and $\nu_{64}$ are the Abbe numbers of said negative meniscus single lens and said positive meniscus single lens, respectively.

5. A zoom lens according to claim 1, wherein one of said third lens unit and said fourth lens unit is comprised of a meniscus single lens having its convex surface facing the image side, and the other is comprised of a cemented meniscus lens having its convex surface facing the image side.

6. A zoom lens according to claim 1, wherein said stop is disposed between said fourth lens unit and said fifth lens unit, and the lens in said fifth lens unit which is most adjacent to the object side is comprised of a biconvex lens whose image side surface is aspherical.

7. A zoom lens according to claim 1, characterized by the data of the following Tables 1 and 2, wherein No. designates an optical surface, $G_1$–$G_5$ designate corresponding lens units, and P designates a resolving prism succeeding the fifth lens unit:

TABLE 1

(Embodiment 1)

Focal length: 12.8–67.5　　Zoom ratio: 5.27
Angle of view $2\omega$ = 66.1–13.4　　FNO: 1.5

| No. | Radius of curvature r | Center-thickness and spacing d | Refractive index n | Abbe number $\nu$ | |
|---|---|---|---|---|---|
| 1 | 339.738 | 3.400 | 1.62287 | 60.14 | $G_1$ |
| 2 | 108.122 | 20.000 | | | |
| 3 | −249.753 | 2.500 | 1.62287 | 60.14 | |
| 4 | 141.674 | 1.000 | | | |
| 5 | 122.834 | 8.000 | 1.86954 | 23.01 | |
| 6 | 213.054 | 9.351 | | | |
| 7 | 317.399 | 3.300 | 1.86954 | 23.01 | |
| 8 | 109.776 | 23.500 | 1.49926 | 82.52 | |
| 9 | −133.088 | 0.200 | | | |
| 10 | 125.476 | 13.700 | 1.59527 | 67.87 | |

TABLE 1-continued (Embodiment 1)

Focal length: 12.8–67.5　　Zoom ratio: 5.27
Angle of view $2\omega$ = 66.1–13.4　　FNO: 1.5

| No. | Radius of curvature r | Center-thickness and spacing d | Refractive index n | Abbe number $\nu$ | |
|---|---|---|---|---|---|
| 11 | −472.357 | 0.200 | | | |
| 12 | 77.994 | 11.800 | 1.49926 | 82.52 | |
| 13 | 324.018 | $d_{13}$ = variable | | | |
| 14 | 107.528 | 1.200 | 1.61992 | 54.01 | $G_2$ |
| 15 | 22.959 | 11.200 | | | |
| 16 | −106.622 | 1.200 | 1.62540 | 57.03 | |
| 17 | 51.368 | 1.600 | | | |
| 18 | 35.182 | 16.700 | 1.65530 | 38.18 | |
| 19 | −25.804 | 1.200 | 1.74800 | 49.52 | |
| 20 | 182.729 | $d_{20}$ = variable | | | |
| 21 | −43.137 | 1.500 | 1.72342 | 50.19 | $G_3$ |
| 22 | −120.634 | $d_{22}$ = variable | | | |
| 23 | −65.472 | 4.000 | 1.86954 | 23.01 | $G_4$ |
| 24 | −47.715 | $d_{24}$ = variable | | | |
| 25 | 63.154 | 12.500 | 1.60718 | 38.03 | $G_5$ |
| 26 | −39.449 | 2.000 | 1.80824 | 46.54 | |
| 27 | −143.650 | 10.000 | | | |
| 28 | −52.490 | 2.000 | 1.69978 | 55.60 | |
| 29 | 142.269 | 11.000 | | | |
| 30 | 215.187 | 10.000 | 1.51872 | 64.10 | |
| 31 | −51.841 | 0.200 | | | |
| 32 | 236.399 | 10.000 | 1.52037 | 69.98 | |
| 33 | −112.413 | 0.200 | | | |
| 34 | 142.608 | 2.500 | 1.81267 | 25.35 | |
| 35 | 38.435 | 13.500 | 1.49926 | 82.52 | |
| 36 | −285.137 | 0.200 | | | |
| 37 | 42.377 | 8.500 | 1.52037 | 69.98 | |
| 38 | 135.289 | 5.000 | | | |
| 39 | ∞ | 18.500 | 1.51872 | 64.10 | P |
| 40 | ∞ | 50.500 | 1.69978 | 55.60 | |
| 41 | ∞ | 11.890 | | | |

TABLE 2

(variable spacings between units in Embodiment 1)

| f | 12.8 | 40.0 | 67.5 |
|---|---|---|---|
| $d_{13}$ | 0.629 | 48.012 | 61.783 |
| $d_{20}$ | 66.296 | 5.582 | 5.812 |
| $d_{22}$ | 12.426 | 17.256 | 13.255 |
| $d_{24}$ | 6.598 | 15.098 | 5.098 |

8. A zoom lens according to claim 1, characterized by the data of the following Tables 3 and 4, wherein No. designates an optical surface, $G_1$–$G_5$ designates corresponding lens units, and P designates a resolving prism succeeding the fifth lens unit:

TABLE 3

(Embodiment 2)

Focal length: 12.8–67.4　　Zoom ratio: 5.27
Angle of view $2\omega$ = 66.1–13.4　　FNO: 1.5

| No. | Radius of curvature r | Center-thickness and spacing d | Refractive index n | Abbe number $\nu$ | |
|---|---|---|---|---|---|
| 1 | 339.738 | 3.400 | 1.62287 | 60.14 | $G_1$ |
| 2 | 108.122 | 20.000 | | | |
| 3 | −249.753 | 2.500 | 1.62287 | 60.14 | |
| 4 | 141.674 | 1.000 | | | |
| 5 | 122.834 | 8.000 | 1.86954 | 23.01 | |
| 6 | 213.054 | 8.782 | | | |
| 7 | 318.127 | 3.300 | 1.86954 | 23.01 | |
| 8 | 101.285 | 23.500 | 1.49926 | 82.52 | |
| 9 | −151.087 | 0.200 | | | |
| 10 | 128.047 | 14.500 | 1.62287 | 60.14 | |
| 11 | −289.393 | 0.200 | | | |
| 12 | 76.961 | 11.000 | 1.49926 | 82.52 | |
| 13 | 249.760 | $d_{13}$ = variable | | | |
| 14 | 107.528 | 1.200 | 1.61992 | 54.01 | $G_2$ |

TABLE 3-continued (Embodiment 2)

Focal length: 12.8–67.4  Zoom ratio: 5.27
Angle of view 2ω = 66.1–13.4  FNO: 1.5

| No. | Radius of curvature r | Center-thickness and spacing d | Refractive index n | Abbe number ν | |
|---|---|---|---|---|---|
| 15 | 22.959 | 11.200 | | | |
| 16 | −115.190 | 1.200 | 1.65426 | 58.50 | |
| 17 | 49.661 | 1.600 | | | |
| 18 | 35.540 | 16.700 | 1.65530 | 38.18 | |
| 19 | −28.116 | 1.200 | 1.77651 | 49.45 | |
| 20 | 309.744 | $d_{20}$ = variable | | | |
| 21 | −43.137 | 1.500 | 1.77651 | 49.45 | $G_3$ |
| 22 | −107.766 | $d_{22}$ = variable | | | |
| 23 | −71.854 | 2.000 | 1.80086 | 45.37 | $G_4$ |
| 24 | −320.000 | 4.500 | 1.81267 | 25.35 | |
| 25 | −50.789 | $d_{25}$ = variable | | | |
| 26 | 58.324 | 8.000 | 1.55098 | 45.87 | $G_5$ |
| 27 | −153.033 | 10.000 | | | |
| 28 | −45.245 | 2.000 | 1.72342 | 50.19 | |
| 29 | 146.257 | 11.000 | | | |
| 30 | 217.601 | 10.500 | 1.52040 | 60.23 | |
| 31 | −53.615 | 0.200 | | | |
| 32 | 232.170 | 7.000 | 1.52037 | 69.98 | |
| 33 | −111.303 | 0.200 | | | |
| 34 | 137.366 | 2.500 | 1.81267 | 25.35 | |
| 35 | 38.126 | 13.500 | 1.48914 | 70.41 | |
| 36 | −193.091 | 0.200 | | | |
| 37 | 42.377 | 8.500 | 1.52037 | 69.98 | |
| 38 | 99.668 | 5.000 | | | |
| 39 | ∞ | 18.500 | 1.51872 | 64.10 | P |
| 40 | ∞ | 50.500 | 1.69978 | 55.60 | |
| 41 | ∞ | 11.974 | | | |

TABLE 4

(variable spacings between units in Embodiment 2)

| f | 12.8 | 40.0 | 67.4 |
|---|---|---|---|
| $d_{13}$ | 1.783 | 49.089 | 62.937 |
| $d_{20}$ | 65.888 | 3.547 | 5.404 |
| $d_{22}$ | 8.988 | 13.522 | 9.817 |
| $d_{25}$ | 15.894 | 26.394 | 14.394 |

9. A zoom lens according to claim 1, characterized by the data of the following Tables 5 and 6, wherein No. designates an optical surface, $G_1$–$G_5$ designate corresponding lens units, and P designates a resolving prism succeeding the fifth lens unit:

TABLE 5

(Embodiment 3)

Focal length: 12.7–70.0  Zoom ratio: 5.51
Angle of view 2ω = 66.3–13.4  FNO = 1.5

| No. | Radius of curvature r | Center-thickness and spacing d | Refractive index n | Abbe number ν | |
|---|---|---|---|---|---|
| 1 | 352.819 | 3.400 | 1.62287 | 60.14 | $G_1$ |
| 2 | 112.285 | 20.000 | | | |
| 3 | −259.369 | 2.500 | 1.62287 | 60.14 | |
| 4 | 147.129 | 1.000 | | | |
| 5 | 127.563 | 8.000 | 1.86954 | 23.01 | |
| 6 | 221.257 | 9.351 | | | |
| 7 | 342.701 | 3.300 | 1.86954 | 23.01 | |
| 8 | 110.315 | 23.500 | 1.49926 | 82.52 | |
| 9 | −141.122 | 0.200 | | | |
| 10 | 125.876 | 13.700 | 1.60548 | 60.64 | |
| 11 | −406.401 | 0.200 | | | |
| 12 | 78.871 | 11.800 | 1.49926 | 82.52 | |
| 13 | 268.252 | $d_{13}$ = variable | | | |
| 14 | 108.635 | 1.200 | 1.61992 | 54.01 | $G_2$ |
| 15 | 23.195 | 11.200 | | | |
| 16 | −137.323 | 1.200 | 1.62540 | 57.03 | |
| 17 | 43.672 | 1.600 | | | |
| 18 | 33.753 | 16.700 | 1.65530 | 38.18 | |
| 19 | −26.661 | 1.200 | 1.74800 | 49.52 | |
| 20 | 179.896 | $d_{20}$ = variable | | | |
| 21 | −44.766 | 1.500 | 1.72342 | 50.19 | $G_3$ |
| 22 | 250.000 | 3.400 | 1.81267 | 25.35 | |
| 23 | −149.383 | $d_{23}$ = variable | | | $G_4$ |
| 24 | −93.667 | 4.000 | 1.76258 | 31.62 | |
| 25 | −50.815 | $d_{25}$ = variable | | | |
| 26 | 64.773 | 10.000 | 1.55098 | 45.87 | $G_5$ |
| 27 | −40.425 | 2.000 | 1.80824 | 46.54 | |
| 28 | −147.189 | 10.000 | | | |
| 29 | −56.000 | 2.000 | 1.67303 | 57.53 | |
| 30 | 145.269 | 11.000 | | | |
| 31 | 211.361 | 9.000 | 1.51872 | 64.10 | |
| 32 | −53.380 | 0.200 | | | |
| 33 | 173.525 | 7.000 | 1.56606 | 60.69 | |
| 34 | −122.090 | 0.200 | | | |
| 35 | 155.690 | 2.500 | 1.79181 | 26.05 | |
| 36 | 38.224 | 13.000 | 1.49926 | 82.52 | |
| 37 | −562.364 | 0.200 | | | |
| 38 | 45.431 | 7.500 | 1.51872 | 64.10 | |
| 39 | 143.237 | 5.000 | | | |
| 40 | ∞ | 18.500 | 1.51872 | 64.10 | P |
| 41 | ∞ | 50.500 | 1.69978 | 55.60 | |
| 42 | ∞ | 12.040 | | | |

TABLE 6

(variable spacings between units in Embodiment 3)

| f | 12.7 | 40.0 | 70.0 |
|---|---|---|---|
| $d_{13}$ | 0.588 | 49.862 | 65.024 |
| $d_{20}$ | 71.666 | 8.299 | 6.185 |
| $d_{23}$ | 11.846 | 19.439 | 12.891 |
| $d_{25}$ | 9.302 | 15.802 | 9.302 |

* * * * *